United States Patent [19]
Lo et al.

[11] Patent Number: 5,905,593
[45] Date of Patent: May 18, 1999

[54] METHOD AND APPARATUS OF PRODUCING 3D VIDEO BY CORRECTING THE EFFECTS OF VIDEO MONITOR ON LENTICULAR LAYER

[75] Inventors: Allen Kwok Wah Lo, Dunwoody; Kenneth Quochuy Lao, Lawrenceville, both of Ga.

[73] Assignee: 3-D Image Technology, Norcross, Ga.

[21] Appl. No.: 08/559,550

[22] Filed: Nov. 16, 1995

[51] Int. Cl.⁶ .......................... G20B 27/22; G20B 27/10; G30B 21/60; H04N 9/47
[52] U.S. Cl. .......................... 359/463; 359/462; 359/464; 359/619; 359/620; 359/458; 359/455; 359/451; 348/54; 348/59
[58] Field of Search ...................................... 359/619, 620, 359/621, 622, 624, 625, 451, 458, 462, 463, 464; 348/51, 58, 59

[56] References Cited

U.S. PATENT DOCUMENTS

| | | |
|---|---|---|
| 3,814,513 | 6/1974 | Nims et al. . |
| 4,506,296 | 3/1985 | Marraud et al. . |
| 4,807,024 | 2/1989 | McLaurin et al. . |
| 4,893,898 | 1/1990 | Beard . |
| 5,113,213 | 5/1992 | Sandor et al. . |
| 5,276,478 | 1/1994 | Morton . |
| 5,278,608 | 1/1994 | Taylor et al. . |
| 5,311,329 | 5/1994 | Haeberli et al. . |
| 5,400,177 | 3/1995 | Petitto et al. ............................ 359/451 |
| 5,493,427 | 2/1996 | Nomura et al. ............................ 359/15 |
| 5,518,794 | 5/1996 | Sandor et al. ............................ 348/51 |
| 5,528,420 | 6/1996 | Momochi ................................ 359/463 |

*Primary Examiner*—Cassandra Spyrou
*Assistant Examiner*—Audrey Chang
*Attorney, Agent, or Firm*—Deveau, Colton & Marquis

[57] ABSTRACT

A 3D video viewing system is disclosed, wherein a special lenticular layer is attached on a video monitor which displays at least one interleaved image composed from a plurality of 2D views of a scene. A method of determining the parameters for the lenticular layer is disclosed. In particular, the width of the lenticules on the lenticular layer is determined by many factors, including the thickness, the curvature and the refractive index of the monitor; the number of 2D views to be composed into an interleaved image for display; the normal viewing distance; and the overall viewing angle of the lenticular layer itself. A number of interleaving methods for composing a plurality of 2D views into a composite view are also disclosed.

21 Claims, 10 Drawing Sheets

METHOD AND APPARATUS OF PRODUCING 3D VIDEO BY CORRECTING THE EFFECTS OF VIDEO MONITOR ON LENTICULAR LAYER

BACKGROUND OF THE INVENTION

The present invention relates to three-dimensional (3D) video or television, and more specifically to a lenticular 3D display wherein 3D scenes are viewed through a lenticular layer.

Even though lenticular 3D photography has become a reality where consumers can take 3D pictures with multi-lens camera, quality lenticular 3D television where a stationary or moving scene with depth can be viewed without using special glasses is still not available. McLaurin et al (U.S. Pat. No. 4,807,024) discloses a method of producing a depth effect on a monitor. This disclosed method involves using a single camera mounted on a platform moving at the constant velocity and spacing to take a sequence of 2D images; and presenting the 2D images in a stereoscopically related sequence on a video monitor for viewing. Beard (U.S. Pat. No. 4,893,898) discloses a method of using a pair of viewing glasses in which one lens is darker than the other for viewing a moving scene displayed on a monitor screen. These two disclosed methods display only one 2D view at a time and both of the viewer's eyes see the same view at any time. These methods are different from a lenticular 3D photograph where a plurality of different 2D views of a view are simultaneously displayed so that, through a lenticular layer, each of the viewer's eyes sees a different view.

Nims et al (U.S. Pat. No. 3,814,513) discloses a 3D projection system which uses two lenticular screens, one for viewing and one for composing, and a light diffusing sheet to form a projection screen. The composing screen is vibrating harmonically so that the compressed line-form images at its backside fill the blank spacing between line-form images. Marraud et al (U.S. Pat. No. 4,506,296) discloses a method of making lenticular print, which involves composing a composite image on a cathoscope; photographing the composite image through an anamorphosis device; and overlaying a lenticular grating on the photograph. None of the above-mentioned disclosed methods addresses the issue of directly applying a lenticular layer on the surface of the cathode ray tube (CRT) screen for viewing a 3D scene.

Lenticular technique has not been successfully applied to television or video mainly due to the fact that most monitor screens are curved outwardly and the CRT is rather thick and the thickness may be uneven. Furthermore, the width of the lenticules must vary with the size of the monitor screen, the video line resolution, the number of 2D views to be simultaneously displayed, and the thickness of the CRT. This is in contrast to lenticular 3D photography where the width of the lenticules is not determined by the number of 2D views or the size of the photograph.

SUMMARY OF THE INVENTION

The present invention uses a special lenticular layer to attach on a video monitor screen for viewing composite images displayed on the monitor. It should be noted that, the lenticular layer for attaching on a monitor screen is different from the lenticular screen for attaching on a 3D picture in two ways. First, the regular lenticular screen comprises an array of cylindrical lens with each lens having a focal point coincidence with the back plane of the screen. In contrast, on the lenticular layer for attaching on a monitor screen for 3D viewing, the focal point of each cylindrical lens is substantially farther behind the back side of the layer. Second, with the regular lenticular screen the thickness and lenticule width are virtually unrestricted, because the screen thickness is solely determined by the radius of curvature of the lenticules, and the refractive index of screen material. In contrast, the parameters of the lenticular layer for 3D video viewing are determined by many factors. The relevant factors are listed below:

a) Display unit (television set or video monitor)—screen size, video line resolution, screen curvature, refractive index and thickness of the CRT.

b) Images—number of 2D views to be used for composing the composite image.

c) Viewing conditions—total viewing angle, normal viewing distance.

d) Lenticular layer—lenticule curvature, refractive index, lenticular width, thickness.

The inter-relation between the above-listed factors are explained, and the relevant parameters are derived in the following sections, in reference to the accompanying drawing figures.

It should be noted that, even though both 3D photographs and 3D video displays use lenticules to separate line-form images formed behind each lenticule, the formation of the line-form images on a 3D photograph is entirely different from that on a 3D video. The line-form images on a 3D photograph are optically compressed through lenticules during exposure, the line-form images on a 3D video monitor are composed by interleaving video lines of different 2D views. The present invention provides a number of methods for composing the composite view containing interleaved line-form images from a plurality of 2D views of a stationary or a moving scene for 3D video viewing.

It should also be noted that a viewer can watch a regular 2D television program or video display through the lenticular layer. However, it may be desirable to take the lenticular layer off the screen when watching a regular 2D program and put the layer on when watching a 3D program.

It is the objective of the present invention to provide a method and an apparatus for 3D lenticular display, allowing a viewer to view a stationary or moving scene on a television set or a video monitor without using a pair of special glasses. It is another objective of the present invention to provide a method for determining the parameters of a special lenticular layer suitable for attaching on a television set or a video monitor for 3D and 2D viewing.

It is yet another objective of the present invention to provide several methods of composing composite images from a series of 2D images for 3D viewing.

DETAILED DESCRIPTION OF THE INVENTION

Figure 1:
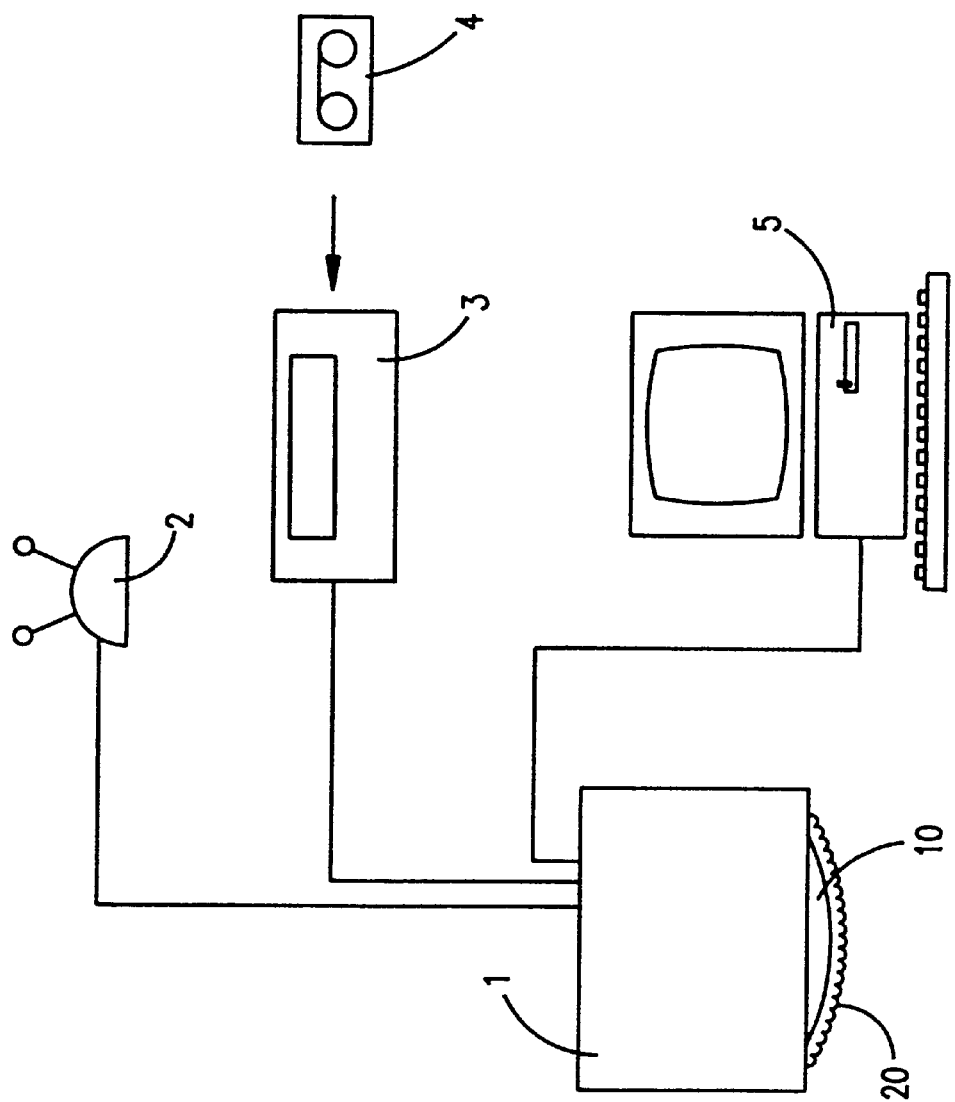
FIG. 1 depicts the overall 3D viewing system.

FIG. 1 depicts the overall 3D video viewing system, according to the present invention. As shown in FIG. 1, numeral 1 denotes a television set or a video monitor, hereafter referred to as a monitor. Numeral 10 denotes the monitor screen overlaid by a lenticular layer 20. The video signals can be received by an antenna 2; or conveyed from a signal conveyer which conveys images stored in a proper storing medium. In FIG. 1, video signals can be conveyed from a VCR 3 playing a video tape 4, or from a CD-ROM drive, laser-disk drive which read image information from a CD-ROM or a laser-disk. The signals can also be conveyed from a computer workstation 5 wherein images are stored in a hard-disk. The lenticular layer 20 comprises a contiguous array of cylindrical lenses, or lenticules, having a common longitudinal axis. For 3D viewing, the lenticular layer is attached to the monitor screen such that the longitudinal axes of the lenticules are substantially oriented in the vertical direction, perpendicular to the lines joining a viewer's eyes to the axes. The lenticular layer can be constructed so that it may be detached from the monitor screen for ordinary 2D viewing and reattached for 3D viewing or is permanently attached. Alteratively, the lenticular layer can be formed as an integral part of the screen of the video monitor.

The lenticular layer may be formed from any suitable material with the necessary qualities as is well known in the 3D photography field. It is understood that the images stored in the storing medium and/or conveyed to the monitor are composite views or interleaved images composed from at least one series of N 2D views of a scene acquired by image acquiring means at N different viewing angles, where N can be an integer between 2 and 50 or more. These 2D views can also-be generated-by a computer. Computer work station 5, or a microprocessor or other type of computer can be used to compose the composite images from the 2D views obtained by a video camera or generated by the computer. The resulting composite view is conveyed to the video monitor for display.

Figure 2:
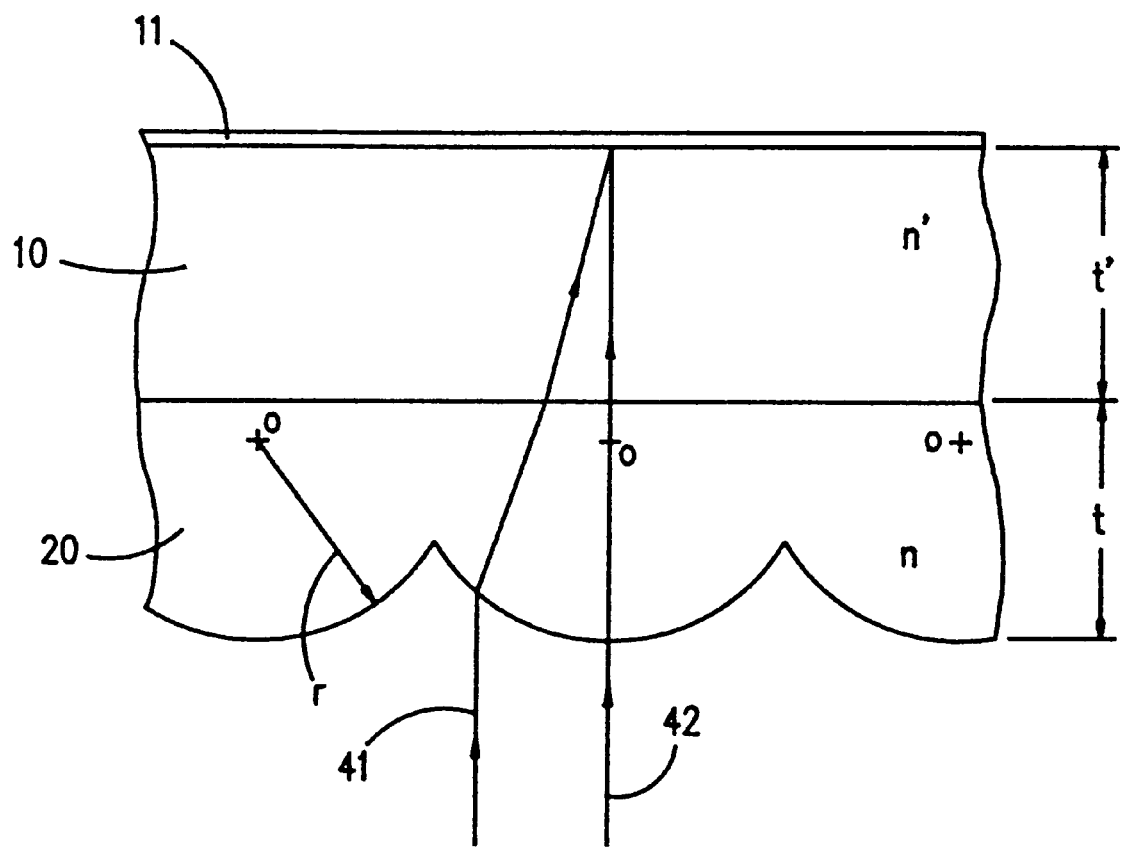
FIG. 2 illustrates the effect of CRT thickness and the refractive index on the thickness of the lenticular layer.

FIG. 2 illustrates the effect of the CRT thickness on the thickness of the overlying lenticular layer. It should be noted that the image displayed on a monitor screen 10 is not formed on the surface of the screen. Rather, the image is formed on the phosphor coating(s) on the inside surface 11 of the CRT. As depicted in FIG. 2, the thickness and the refractive index of the CRT are denoted by t' and n', respectively. The thickness and the refractive index of the overlying lenticular layer are denoted by t and n, respectively. The lenticular layer comprises a contiguous array of cylindrical lens, or lenticules, whose width and radius of curvature are denoted by w and r. In order that parallel light rays 41, 42 transmitted through a lenticule converge at a point on the inside surface 11 of the CRT, the thickness t must take into account the refractive indices of the transmitting media, as given by Eq.1:

$$t=(n/(n-1))r-t'(i/n') \tag{1}$$

In FIG. 2, the letter o denotes the center of curvature of each lenticule on the lenticular layer 20.

It is obvious that the thickness of the lenticular layer cannot be equal to or less than 0. Thus, we have $$r > t'(n-1)/n' \tag{2}$$

This is the lower limit of the radius of curvature of the lenticules. Nevertheless, for practical reasons, the lenticular layer must have a thickness and cannot be too thin.

For example, if the thickness of the lenticular layer is equal to or thicker than r, then Eq.1 becomes:

$$(n/(n-1))r - t'(n/n') \geq r$$

$$r \geq (n-1)(n/n')t' \tag{3}$$

The above equations set the restriction criteria on the radius of curvature of the lenticules by the thickness of the CRT. For example, if n=n'=1.5 and t'=5 mm, then r must be larger than 2.5 mm, according to Eq.3. It should be remembered that the thickness, t, of the lenticular layer can be smaller or greater than r. In general, we can let t=kr, where k is a constant given by 0<k<n/(n-1) but preferably a value between 0.5 and 2. From Eq.1, we find the lower limit of r, or r(min):

$$r(min)=(n/n')(n-1)t'/(n-nk+k) \tag{4}$$

Figure 3:
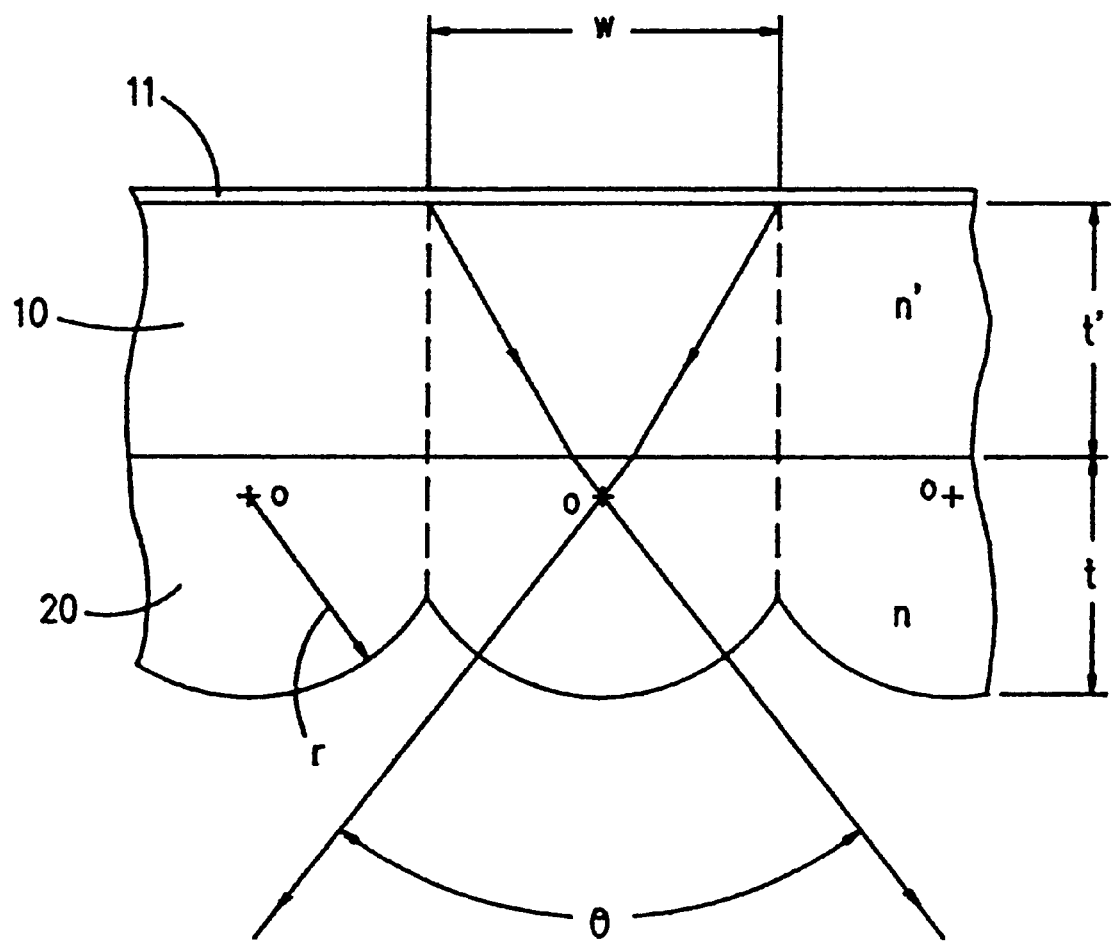
FIG. 3 illustrates the relationship between the lenticule width and the total viewing angle thereof.

FIG. 3 shows the relationship between the lenticule width, w, and the total viewing angle, Θ, thereof. The lenticule width w is given by:

$$w=\{t+t'(n/n')-r\}\Theta \tag{5}$$

Preferably, the total viewing angle is a value selected, preferably, between 5 and 60 degrees. If the thickness, t, of the lenticular layer is equal or greater than r, or (t−r) ≧0, we have $$w/\Theta \geq t'(n/n') \tag{6}$$

For illustration purposes only, let us choose Θ=28.65 degrees or 0.5 rad, and n=n', then Eq.6 is reduced to w >0.5t', or the lenticule width cannot be smaller than half of the CRT thickness t'. If the CRT is 5 mm thick at the screen area, then the lenticules must be at least 2.5 mm wide. In contrast, the lenticule width of a lenticular screen used on a 3D photograph can be made as small as technologically feasible. In 3D photography, a lenticule width of 0.1 mm or smaller is not uncommon.

In general, when we set t=kr, the lower limit of lenticular width is given by $$w(min)=\{t'(n/n')-r(min)\}\Theta=t'(n/n')\Theta/(n-nk+k) \tag{7}$$

Figure 4:
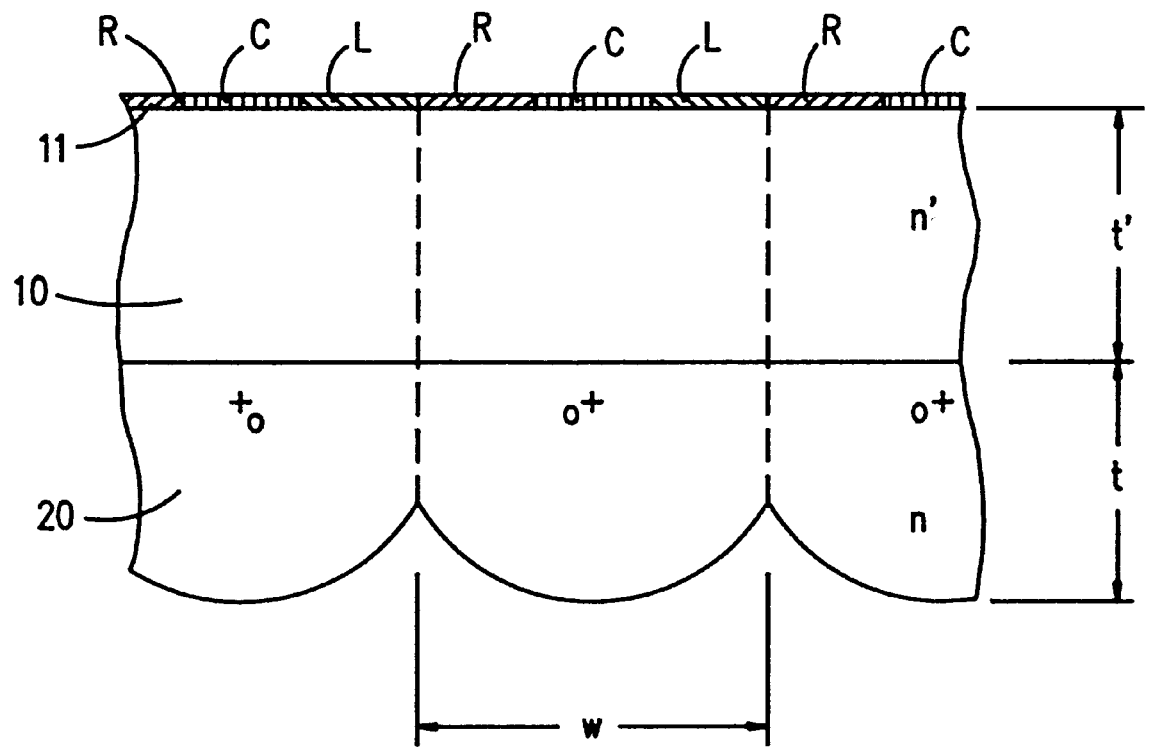
FIG. 4 shows the relationship between the video line resolution, the number of 2D views to be composed into a composite view and the lenticule width.

FIG. 4 shows the relationship between the video line resolution of the monitor screen together with the number, N, of 2D views to be composed into a composite image for display. For illustration purposes only, the number of 2D views to be composed into a composite image is chosen to be 3, or N=3. Thus, here are 3 interleaved line-form images under each lenticule, as denoted by R, C, and L. If the video line resolution of the monitor screen is given by the pitch, p, then the lenticule width, w, must be equal to an integral of Np, or $$w=MNp \tag{8}$$

where M is a positive integer, ranging from 1 to 10. If t is equal or larger than r, we further have $$MNp/\Theta) \geq t'(n/n')$$

$$M \geq t'(\Theta/Np)(n/n') \quad (9)$$

Assuming that N=3, Θ=0.5 rad and n=n', we further reduce Eq.9 to:

$$M \geq t'/6p \quad (10)$$

For example, if the monitor width is 10" and displaying 500 lines, the resolution is 50 lines per inch (about 2 lines per mm) or p=0.02" or 0.5 mm, we have $$M \geq t'/3(t' \text{ in mm}) \quad (11)$$

If t'=5 mm, then M must be equal or larger than 2. This means that even though the number of 2D views is only 3, the number of video lines per lenticule (N×M) must be 6, 9 or higher. By substituting N=3, p=0.5 mm into Eq.8, we have w=1.5M (mm). Accordingly, the lenticule width is 3 mm if M=2, 4.5 mm if M=3, or even greater if M is larger than 3. In general, if t=kr, we have $$M(min)=Int\{w(min)/Np\}=Int\{t'(n/n')/Np(n-nk+k)\} \quad (12)$$

where Int{x} means the smallest integer which is equal to or larger than x. For example, if x=2.2, then Int{x}=3. According, M can be selected from any integer from M(min) to 10 and w can be determined by Eq.8.

Figure 5:
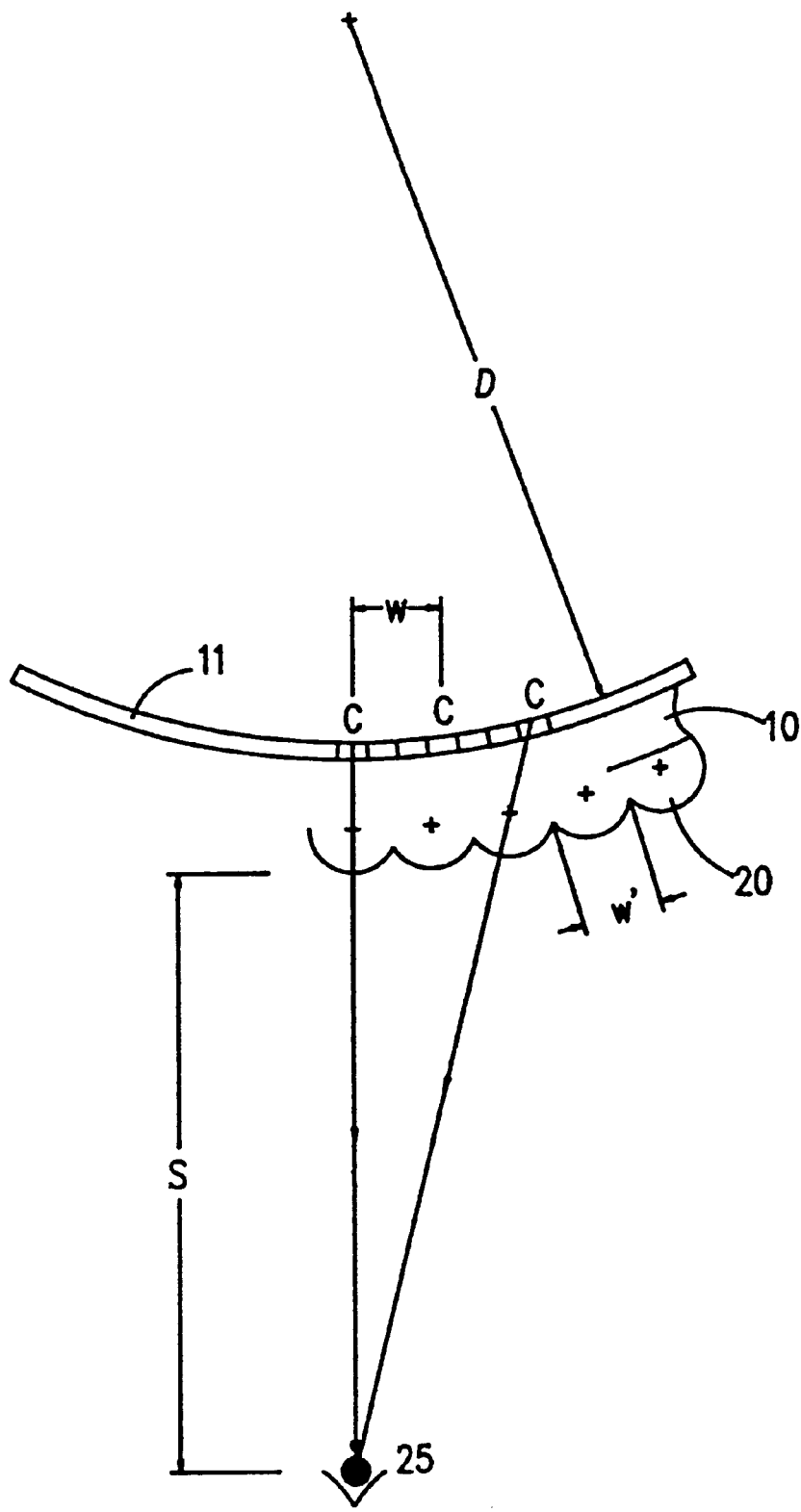
FIG. 5 illustrates the effect of monitor screen curvature together with the normal viewing distance on the lenticule width.

FIG. 5 illustrates the effect of monitor screen curvature together with the normal viewing distance on the lenticule width of the lenticular layer. If the monitor screen is flat and the viewing distance is very large, then the lenticule width is given by Eq.8. In that case, the interleaved line-form images under each lenticule must be accurately aligned with the lenticule itself. For example, the interleaved image C is always located at the center of the lenticule width. However, when the screen is curved outwardly as shown in FIG. 5 and the normal viewing is not very large, then the lenticule width must be reduced. As shown in FIG. 5, the monitor screen curvature (in linear terms) is denoted by D and the normal viewing distance is denoted by S. In order that the line-form image C be seen by the same eye 25 of a viewer located as a distance S away from the monitor screen 10, then the lenticule width must be reduced to w', slightly smaller than the spacing between adjacent line-form images C. The reduced lenticule width w' is given by:

$$w'/w = 1 - \{t+t'(n/n')-r\}(1/S+1/D) \quad (13)$$

where w is given by Eq.8. Here, w' is the reduced lenticular width of a lenticular layer to be attached on a monitor screen for 3D video viewing.

Figure 6:
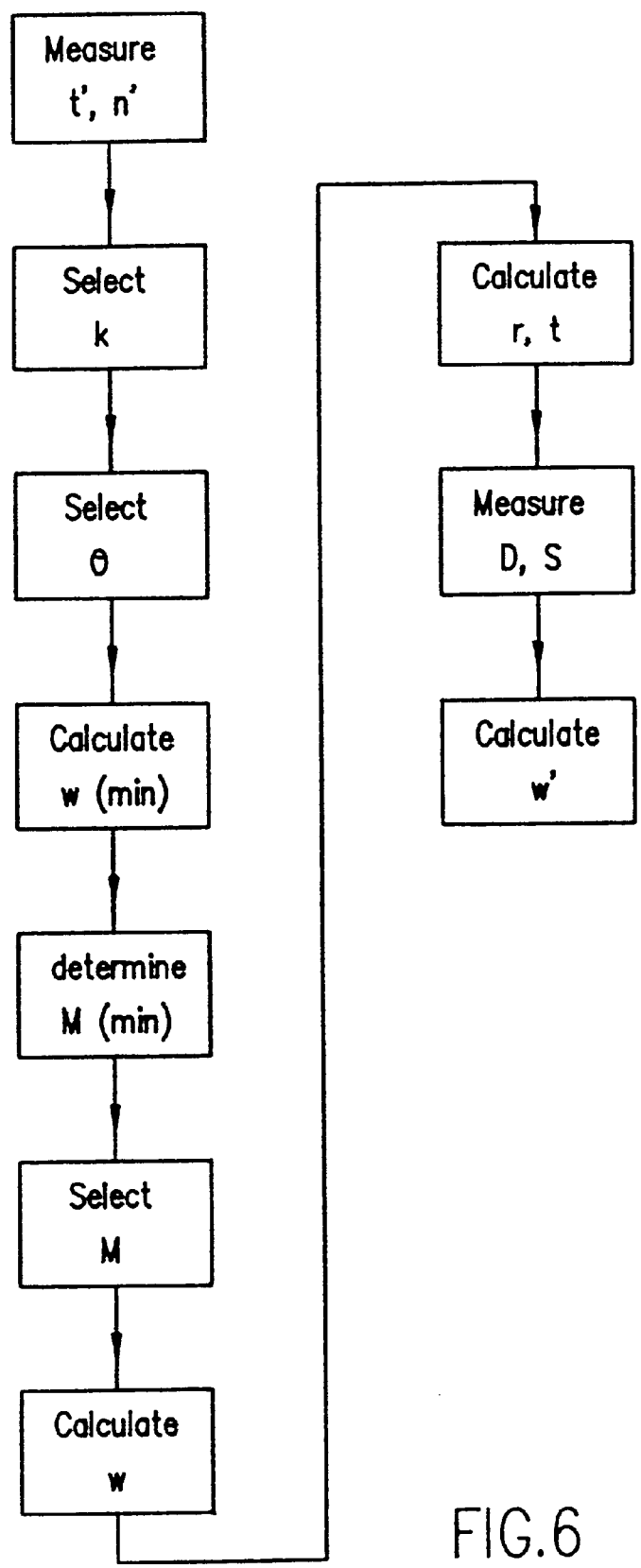
FIG. 6 illustrates the procedure for finding a proper lenticule width of the lenticular layer.

FIG. 6 illustrates the procedure in determining the reduced lenticule width w', radius of curvature r and the thickness t of the lenticular layer. It summarizes the steps given in reference to FIG. 2 to FIG. 5. As shown in FIG. 6, the computation of the proper lenticule width w' involves the following steps:

a) measure the thickness t' and the refractive index n' of the CRT.

b) select a constant k such that t=kr, where t is thickness of the lenticular layer and r is the radius of curvature of the lenticules and, preferably, k is a value between 0.5 and 2.

c) choose a desirable total viewing angle, Θ, of the lenticular layer.

d) calculate the lower limit of lenticular width w, or w(min):

$$w(min)=t'(n/n')\Theta/(n-nk+k).$$

e) determine M(min) according to:

$$M(min)=Int\{w(min)/Np\}$$

f) select M, ranging from M(min) to 10.

g) calculate the lenticular width w in accordance with:

$$w=MNp$$

where N is number of 2D views to be composed into a 3D image and p is the video line resolution of the monitor screen.

h) calculate the radius of curvature r and thickness t according to:

$$r=\{t'(n/n')-w/\Theta)\}/(1-k)$$

$$t=kr.$$

i) measure the curvature D of the monitor screen and set the normal viewing distance S.

j) determine the reduced lenticular width w' in accordance with:

$$w'/w=1-\{t+t'(n/n')-r\}(1/S+1/D)$$

It should be noted that the lenticular layer can be an integral part of the monitor screen, or they can be produced together as one piece with the total thickness equal to (t +t'). In that case, the refractive index n' of the monitor screen and the refractive index n of the lenticular layer are the same or n =n'. Accordingly, Eq. 5 and Eq. 13 are reduced to $$w=(t+t'-r)\Theta \quad (14)$$

and $$w'/w=1-(t+t'-r)(1/S+1/D). \quad (15)$$

FIG. 6 depicts the the necessary steps for calculating the reduced lenticular width w', arranged in the preferred order. It is understood that the order can be rearranged in many different ways. Furthermore, due to fact that the image displaying area on a monitor screen may vary from one monitor to another (even among the monitors of the same size and resolution), it may be necessary to adjust the image size controls such as V-size (vertical), or H-size (horizontal) so that the video lines are properly aligned with the lenticules. Moreover, it is preferable to have a shifting means so that the lenticular layer can be tilted or shifted in the horizontal direction for alignment purposes.

Figure 7:
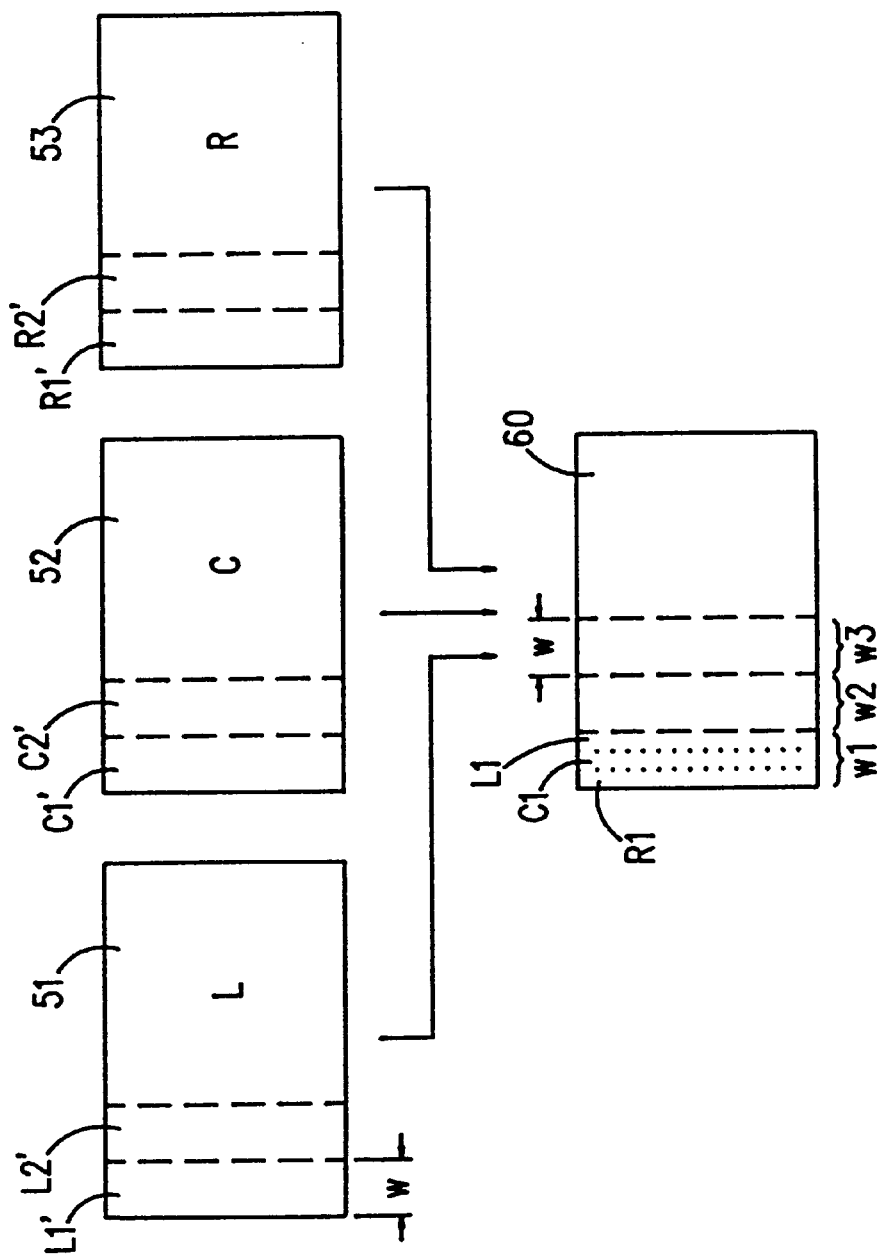
FIG. 7 illustrates the interleaving of a plurality of 2D views into a composite view.

FIG. 7 depicts the interleaving of three 2D views 51, 52 and 53 into a composite image 60. These three 2D views represent the left, center and right views (labeled by L, C, R) of a scene. On the composite image 60, w denotes the lenticular width of the overlying lenticular screen; and w1, w2 and w3 denote the sections of the composite image under the first, second and third lenticules. Preferably, the pixel dimensions of each 2D view and the composite image are the same. For example, if the composite image to be displayed on a video monitor having the pixel dimensions of n lines and m rows of pixels, then it is preferable to use a plurality of 2D views each of which also has the pixel dimensions of n lines and m rows of pixels for interleaving. In the composite image, there are three line-form images, denoted by letters R, C and L, under each lenticule. These line-form images are interleaved from corresponding sections in the 2D views 51, 52 and 53. For example, the line-form images R1, C1, L1 in the w1 section are, respectively, interleaved from the section R1' of 2D view 53, C1' of 2D view 52, and L1' of 2D view 51. The width of sections R1', C1', L1', R2' and so forth is each equal to the lenticular width w. It should be noted that, when M is equal to 2 or larger (see Eq.8 and Eq.11), the interleaved image R1' may cover more than 1 video line, as shown in FIG. 8.

Figure 8:
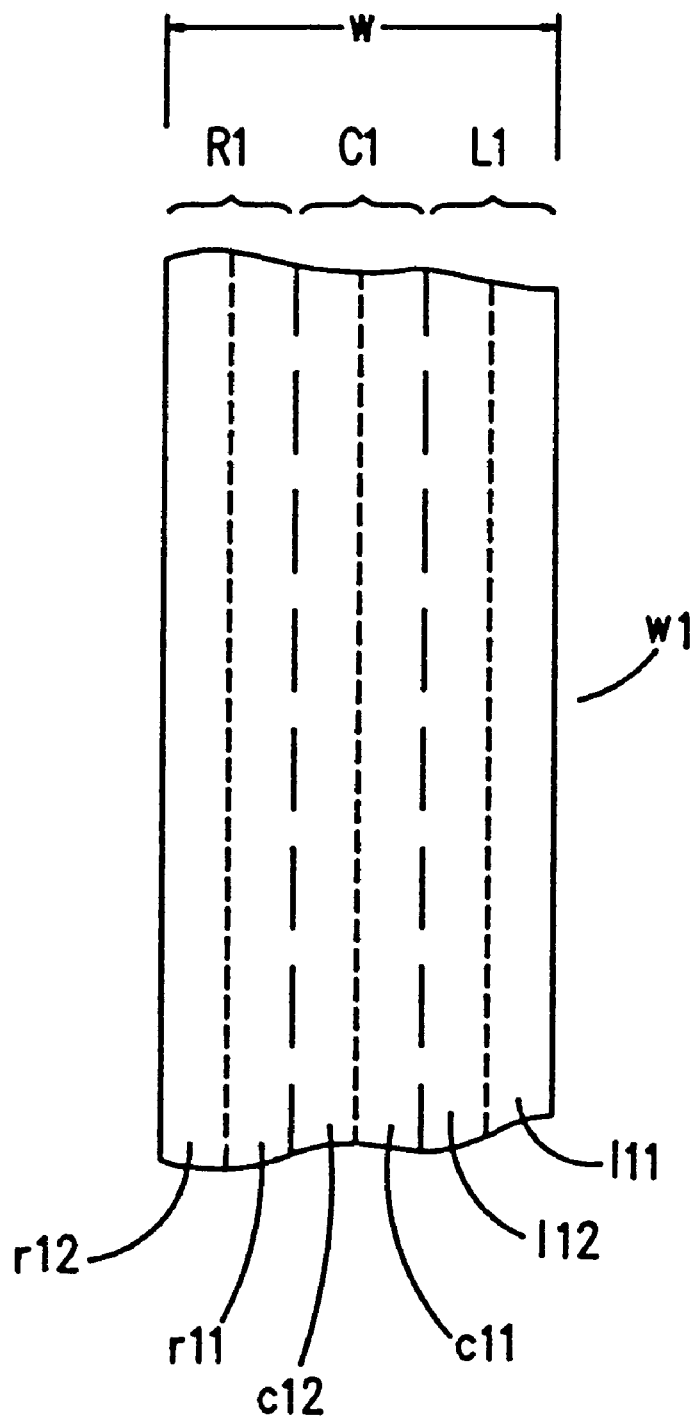
FIG. 8 illustrates a section of the interleaved, or composite, image formed on a monitor screen.

FIG. 8 illustrates a section of the interleaved image formed at the phosphor layers on the interior surface 11 of monitor screen 10 within section w1 of the composite image 60 when M is equal to 2. As shown in FIG. 8, the interleaved image R1 in section w1 comprises two video lines, r11 and r12. Similarly, interleaved image C1 comprises two video lines c11 and c12; and interleaved image L1 comprises two video lines 111 and 112. Thus, the image area under each lenticule in the composite image 60 comprises six video lines.

Figure 9:
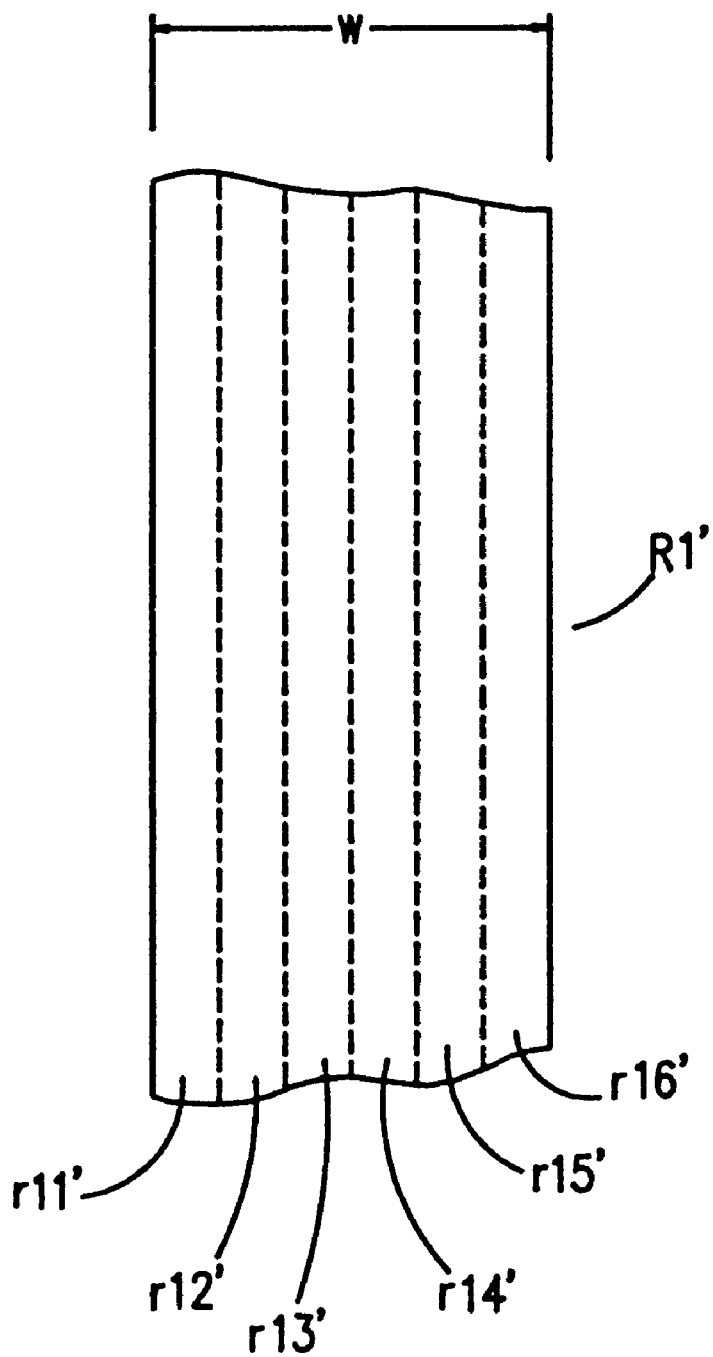
FIG. 9 illustrates a section of one of the 2D views corresponding to the image section illustrated in FIG. 8.

FIG. 9 illustrates the image section R1' on 2D view 53, which is used for interleaving into image section R1 of FIG. 8. As with the image area under each lenticule in the composite image, the image section R1' also contains six video lines, denoted by r11', r12', r13', r14', r15' and r16'.

Figure 10:
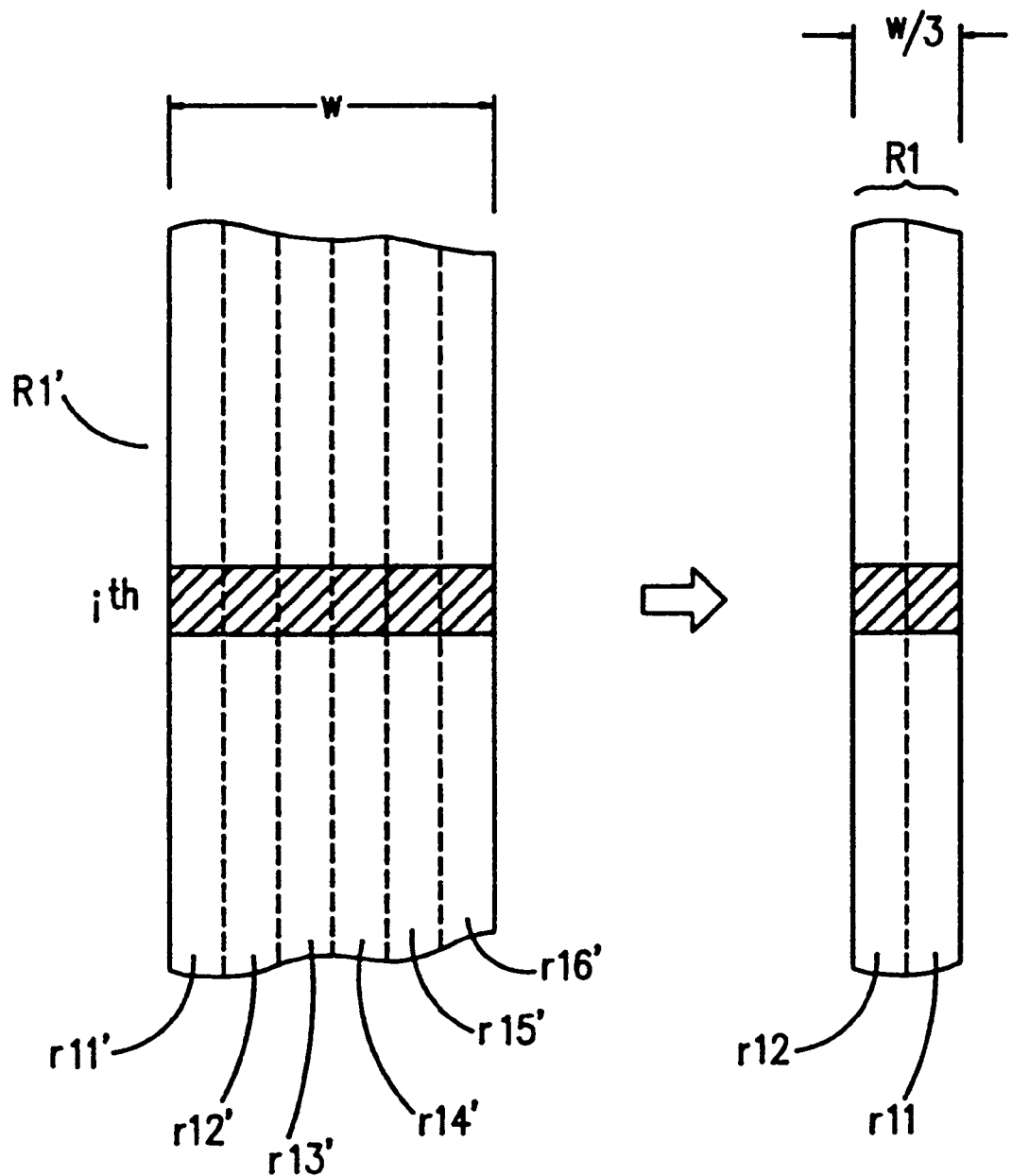
FIG. 10 illustrates the relationship between the section of the composite image of FIG. 8 and the image section of the 2D view of FIG. 9.

FIG. 10 illustrates the relationship between the image section R1' of 2D view 53 and the interleaved image section R1 of the composite view 60. Preferably, each line in the image section R1' and the image section R1 has the same number of pixels. In particular, FIG. 10 shows the ith row of pixels. For convenience, let the video intensity of the ith pixel on line r11' be denoted as $I(r11',i)$ and so forth. With these notations, the interleaving is a process for converting the six pixel intensity values, $I(rlj',i)$ {j=1 to 6}, into two pixel intensity values $I(rl2,i)$ and $I(r11,i)$. The interleaving process, according to the present invention, comprises the following methods:

a) Intensity Averaging:

In general, if a composite image is composed of N 2D views, then the pixel intensity of a video line in the composite image is obtained from averaging the pixel intensity of N video lines of one of the N 2D views. For example, if N =3, then the pixel intensity of a video line of the composite image is obtained from the averaged pixel intensity of 3 video lines in one of the 2D views, R or C or L:

$I(r11,i)=(⅓)\{I(r11',i)+I(r12',i)+I(r13',i)\}$ $I(r12,i)=(⅓)\{I(r14',i)+I(r15',i)+I(r16',i)\}$

A similar process is applied to $I(c11,i)$, $I(c12,i)$, $I(111,i)$ and $I(112,i)$. One simply replaces letter r by c and 1 correspondingly. It should be remembered that the video lines r11' to r16' of the 2D image R are located in image area corresponding to the image area of the composite image under lenticule w1, as shown in FIG. 7.

b) Line Hopping:

In general, if a composite image is composed of N 2D views, then the pixel intensity of a video line in the composite image under a certain lenticule is obtained from the pixel intensity of one of the N video lines within an image area in one of the N 2D views. That image area in the 2D view is corresponding to the an image area under that certain lenticule. For example, if N–3 and M=2, then the pixel intensity of a video line of the composite image under the first lenticule is given by:

$I(r11,i)=I(r11',i)$ $I(r12,i)=I(r12',i)$ $I(c11,i)=I(c13',i)$ $I(c12,i)=I(c14',i)$ $I(111,i)=I(115',i)$ $I(112,i)=I(116',i)$

Here only the two leftmost lines in image section R1', two center lines in image C1' and two rightmost lines in L1' are used. One could also use the two rightmost lines in R1' and two leftmost lines in L1'. It should be remembered that the image section R1', L1' and C1' are corresponding the lenticule w1, as shown in FIG. 7. Alternatively, one may use the following:

$I(r11,i)=I(r11',i)$ $I(c11,i)=I(c12',i)$ $I(111,i)=I(113',i)$ $I(r12,i)=I(r14',i)$ $I(c12,i)=I(c15',i)$ $I(112,i)=I(116',i)$ c) Line Skipping:

$I(r11,i)=I(r11',i)$ $I(c11,i)=I(c12',i)$ $I(111,i)=I(111',i)$ $I(r12,i)=I(r12',i)$ $I(c12,i)=I(c11',i)$ $I(112,i)=I(112',i)$

Here only the two leftmost lines in R1', C1' and L1' are used while all the other lines are skipped. Alternatively, the two center lines or the two rightmost lines in each image sections are used for interleaving.

It is understood that the above interleaving examples are based on the assumption that the composite view or image is composed from three 2D views and that the lenticular width is substantially equal to six video lines. In general, a composite view is composed from N 2D views and the lenticular width, w, is substantially equal to M×N video lines. Thus, the interleaving process is to process M×N image lines in each of the N component 2D views into M lines in the composite image, wherein N is an integer between 2 to 50, and M is an integer between 1 and 50.

d) Reduced Resolution $I(r11,i)=I(r12,i)$ $I(c11,i)=I(c12,i)$ $I(111,i)=I(112,i)$ Here the pixel intensity of the composite image can be obtained from the intensity average method, the line hopping or skipping method.

The present invention has been disclosed according to the preferred methods and apparatus shown in FIGS. 1–10. It is obvious to those skilled in the art that many modifications, additions and deletions can be made therein without departing from the spirit and scope of the invention as set forth in the appended claims.

What is claimed:

1. A method of three dimensional visualization of a scene on a video monitor having a screen by displaying at least one composite image of the scene on the screen, said screen being overlaid with a lenticular layer having lenticules, said lenticular layer being designed for the necessary characteristics of achieving three dimensional visualization, said method comprising the steps of:

(a) obtaining a plurality of 2D views of a scene as viewed from a plurality of viewing angles;

(b) composing said 2D views into said at least one composite image;

(c) conveying said at least one composite image to said monitor to be displayed on said screen and displaying thereon;

wherein the lenticular layer has the characteristics necessary to achieve the desired three dimensional visualization of a scene, with said characteristics of the lenticular layer being determined by the following factors:
 i) the thickness t', the refractive index n' and the curvature D and video line resolution p of said monitor screen;
 ii) the thickness t, and refractive index n of said lenticular layer;
 iii) the width w, radius of curvature r and total viewing angle Θ of said lenticules;
 iv) the normal viewing distance S from said monitor screen; and
 v) the number of 2D views N to be composed into each composite image, where N is an integer of at least 2;
wherein the width w and the thickness t of the lenticular layer and the radius of curvature r of the lenticules are calculated as follows:

$$w=MNp$$

$$r=\{t'n/n'\}-w/\Theta\}/(1-k)$$

$$t=kr$$

where M is a positive integer ranging from 1 to 10, Θ is the total viewing angle of said lenticules and k is a constant given by $0<k<n/(n-1)$ with a preferred value between 0.5 and 2.

2. The method of claim 1 in which the screen on the video monitor is curved and has a top and bottom, said lenticular layer having a corresponding top and bottom, said layer having lenticules with parallel longitudinal axes extending substantially from the top to the bottom of the lenticular layer with the width of the lenticules being reduced from the width calculated in accordance with the formula in claim 1 to take into account the screen curvature and the normal viewing distance as necessary to achieve the desired three dimensional visualization of the scene in accordance with the following formula:

$$w'/w=1-\{t+t'(n/n')-r\}(1/S+1/D)$$

where w' is the reduced width of the lenticules.

3. The method of claim 2 in which the thickness t of the lenticular layer and the radius of curvature r of the lenticules necessary to achieve three dimensional visualization is calculated as follows:

$$r=\{t'(n/n')-w/\Theta\}/(1-k)$$

$$t=kr$$

where Θ is the total viewing angle of said lenticules and k is a constant given by $0<k<n/(n-1)$ with a preferred value between 0.5 and 2.

4. The method of claim 1 in which the thickness t of the lenticular layer and the radius of curvature r of the lenticules necessary to achieve three dimensional visualization is calculated as follows:

$$r=\{t'(n/n')-w/\Theta)\}/(1-k)$$

$$t=kr$$

where Θ is the total viewing angle of said lenticules and k is a constant given by $0<k<n/(n-1)$ with a preferred value between 0.5 and 2.

5. The method of claim 1 in which the lenticular layer having lenticules is an integral part of said screen on the video monitor.

6. The method of claim 1 in which said lenticular layer is attachable on and detachable from the screen of said monitor so as to permit the monitor to be used for both two dimensional and three dimensional visualization.

7. The method of claim 1 in which the lenticular layer is integral to said monitor screen and the refractive index n of said lenticular layer is substantially the same as the refractive index n' of said monitor screen.

8. The method of claim 7 in which the curvature r necessary to achieve three dimensional visualization is calculated as follows:

$$r=\{(t+t')-W/\Theta\}$$

where (t+t') is the total thickness of said lenticular layer and said monitor screen, which have been integrated together.

9. The method of claim 8 in which the width of lenticules is reduced from the width calculated in accordance with formula in claim 8 to take into account the screen curvature and the normal viewing distance as necessary to achieve the desired three dimensional visualization of the screen in accordance with the following formula:

$$w'/w=1-\{(t+t')-r\}(1/S+1/D)$$

where w' is the reduced width of the lenticules.

10. The method of claim 1 in which the composite image displayed on the screen of said monitor is composed of video lines which are aligned with the lenticules in said lenticular layer.

11. The method of claim 1 in which the composing of said 2D views into said at least one composite image in step (b) is performed by interleaving from corresponding sections in the 2D views.

12. The method of claim 1 wherein at least one series of 2D views of the scene as viewed from a plurality of viewing angles in step (a) is generated by a computer and composed into a composite image and conveyed to the screen of said video monitor for display.

13. The method of claim 1 further comprising the steps of storing said at least one composite image in an image storing medium prior to conveying the image to the monitor in step (c).

14. An apparatus for the three dimensional visualization of a scene comprising:
 (a) a video monitor having a screen for displaying at least one composite image of a scene on the screen;
 (b) a lenticular layer having lenticules, said lenticular layer being designed for the three dimensional visualization of a scene from at least one composite image of the scene displayed on said monitor screen, said lenticular layer having a thickness t, and refractive index n, and having a plurality of lenticules of width w, radius of t, and refractive index n, and having a plurality of lenticules of width w, radius of curvature r, and desired viewing angle Θ, said thickness t of the lenticular layer, and lenticule width w and radius of curvature r being selected so that the lenticular layer is capable of achieving the desired three dimensional visualization of a scene displayed on the screen of the video monitor and viewed through the lenticular screen, with these characteristics of the lenticular layer being determined by the following factors:
 i) the thickness t', the refractive index n' and the curvature D and video line resolution p of said monitor screen;
 ii) the normal viewing distance S from said monitor screen;

iii) the number of 2D views N to be composed into each composite image;

(c) means for composing the plurality of 2D views of the scene into at least one composite image and transmitting the composite image to said monitor screen;

wherein the width w and the thickness t of the lenticular layer and the radius of curvature r of the lenticules are calculated as follows:

$$w = MNp$$

$$r = \{t'(n/n') - w/\Theta\}/(1-k)$$

$$t = kr$$

where M is a positive integer ranging from 1 to 10, $\Theta$ is the total viewing angle of said lenticules and k is a constant given by $0 < k < n(n-1)$ with a preferred value between 0.5 and 2.

15. The apparatus of claim 14 in which the screen on the video monitor is curved and has a top and bottom, said lenticular layer having a corresponding top and bottom, said layer having lenticules with parallel longitudinal axes extending substantially from the top to the bottom of the lenticular layer with the width of the lenticules being reduced from the width calculated in accordance with the formula in claim 14 to take into account the screen curvature and the normal viewing distance as necessary to achieve the desired three dimensional visualization of the scene in accordance with the following formula:

$$w'/w = 1 - \{t + t'(n/n') - r\}(1/S + 1/D)$$

where w' is the reduced width of the lenticules.

16. The apparatus of claim 14 further comprising means of storing said at least one composite image in a storage means prior to conveying the image to the monitor.

17. The apparatus of claim 14 in which the lenticular layer is attachable on and detachable from the scene on the monitor so as to permit the monitor to be used for both two dimensional and three dimensional visualization.

18. The apparatus of claim 14 in which the lenticular layer having lenticules is an integral part of said screen on the video monitor.

19. The apparatus of claim 14 in which the video monitor has means to align the video lines forming the composite image so that they are aligned with the lenticules in the lenticular layer.

20. A method of producing a lenticular layer for overlying the screen of the video monitor for the three dimensional visualization of a scene from a least one composite image of the scene displayed on said monitor screen, said lenticular layer having a thickness t, and refractive index n, and having a plurality of lenticules of a width 2, radius of curvature r, and desired viewing angle $\Theta$, said thickness t of the lenticular layer, and lenticule width w and radius of curvature r being selected so that the lenticular layer is capable of achieving the desired three dimensional visualization of a scene displayed on the screen of the video monitor and viewed through the lenticular screen, said lenticular layer being constructed in accordance with the following factors:

i) the thickness t', the refractive index n' and the curvature D and video line resolution p of said monitor screen to which the lenticular layer is designed to be attached;

ii) the normal viewing distance S from said monitor screen;

iii) the number of 2D views to be composed into each composite image; and producing a lenticular layer having the necessary thickness t and refractive index n, with lenticules of a width w and radius of curvature r necessary to achieve the desired three dimensional visualization of the scene; wherein the width w and the thickness t of the lenticular layer and the radius of curvature r of the lenticules are calculated as follows:

$$w = MNp$$

$$r = \{t'(n/n') - w/\Theta\}(1-k)$$

$$t = kr$$

where M is a positive integer ranging from 1 to 10, $\Theta$ is the total viewing angle of said lenticules and k is a constant given by $0 < k < n(n-1)$ with a preferred value between 0.5 and 2.

21. The method of claim 20 in which the screen of the video monitor for which the lenticular layer is being produced is curved and has a top and bottom, said lenticular layer reduced to have a corresponding curve and top and bottom, said layer having lenticules with parallel longitudinal axes extending substantially from the top to the bottom of the lenticular layer with the width of the lenticules being reduced from the width calculated in accordance with the formula in claim 20 to take into account the curvature of the screen on the video monitor and the normal viewing distance as necessary to achieve the desired three dimensional visualization of the scene in accordance with the following formula:

$$w'/w = 1 - \{t + t'(n/n') - r\}(1/S + 1/D)$$

where w' is the reduced width of the lenticules.

* * * * *